United States Patent
Tadros et al.

[11] Patent Number: 5,929,805
[45] Date of Patent: Jul. 27, 1999

[54] DIFFERENTIAL PHASE MEASUREMENT SCHEME FOR A MULTIPLEXING GPS ATTITUDE RECEIVER

[76] Inventors: Alfred Tadros, 3520 Ramstad Dr., San Jose; Hai Ping Jin, 1260 W. Washington Ave., #24, Sunnyvale, both of Calif. 95127; David Mleczko, 4868 Kingdale Dr., San Jose, Calif. 95124

[21] Appl. No.: 08/835,684

[22] Filed: Apr. 10, 1997

Related U.S. Application Data

[51] Int. Cl.[6] .............................. H04B 7/185; G01S 5/02
[52] U.S. Cl. ............................................ 342/357; 701/214
[58] Field of Search .............................. 342/357; 701/214

[56] References Cited

U.S. PATENT DOCUMENTS

| | | | |
|---|---|---|---|
| 5,101,356 | 3/1992 | Timothy et al. ........................ | 364/449 |
| 5,268,695 | 12/1993 | Dentinger et al. ...................... | 342/357 |
| 5,534,875 | 7/1996 | Diefes et al. ........................... | 342/357 |
| 5,543,804 | 8/1996 | Buchler et al. ......................... | 342/357 |
| 5,548,293 | 8/1996 | Cohen ..................................... | 342/357 |
| 5,561,432 | 10/1996 | Knight ..................................... | 342/357 |

*Primary Examiner*—Mark Hellner
*Attorney, Agent, or Firm*—Perman & Green, LLP

[57] ABSTRACT

A method for reducing master antenna tracking errors in a multiplexing GPS receiver resulting in a differential phase measurement scheme which is insensitive to the master antenna tracking loop errors is disclosed. The master antenna tracking loop error at a given update K is subtracted from a phase measurement associated with a slave antenna signal at update K. The method comprises the determination of interpolation coefficients by which the master antenna tracking loop errors are weighted in order to minimize each of the slave antenna differential measurements.

8 Claims, 2 Drawing Sheets

DIFFERENTIAL PHASE MEASUREMENT SCHEME FOR A MULTIPLEXING GPS ATTITUDE RECEIVER

BACKGROUND OF THE INVENTION

1. Field of the Invention

The present invention relates to a global positioning system (GPS) and more particularly, to a method of improving the accuracy of differential phase measurements related to certain GPS receivers.

2. Description of the Prior Art

GPS receivers enable individuals to determine, with a given accuracy, their position on Earth or in space. These position measurements are generally based on signals received from a plurality of satellites. Historically, a GPS receiving system comprises an antenna which receives several signals, each from a different GPS satellite. Since the relationship between the signals received from the satellites is known, the GPS receiving system can compare the signals and note phase differences. These phase differences are then used to pinpoint the location of the GPS receiving system. A GPS receiving system, for example, can be a hand-held unit used by a military person or a mountain climber.

With the development of advanced space vehicles and other types of aircraft and navigable ships it has become more desirable to explore the use of GPS receivers as an indication of platform orientation; an attitude indicator, for example. Such a GPS receiver includes a plurality of antennas with a known orientation. For example, on the bow, stern, starboard and port locations of a ship. Such a system can be used in further research related to the performance of the ship and also as part of a navigational control system onboard the ship. For this type of GPS receiver one of the antennas is deemed the 'master' antenna and the remaining antennas are deemed 'slave' antennas. In operation, the GPS receiver tracks the carrier of the master antenna and notes the phase difference between the signal received by the master antenna with the signals received by the slave antennas. Thus, an orientation of a platform such as a space vehicle, an airplane, or a ship can be accurately calculated based on GPS. See U.S. Pat. No. 5,101,356 (Bowen et al.), for example. Such a system, however, is often expensive since it requires a hardware signal path for each antenna.

In response to alleviating this cost, GPS receivers have been developed to multiplex the incoming antenna signals, requiring only one main hardware path. A multiplexing GPS receiver is described in U.S. Pat. No. 5,268,695 (Dentinger et al.). In a GPS multiplexing receiver system the carrier wave signal received by the master antenna is tracked with a local oscillator such that the phase of the master antenna carrier is held near zero. One or more slave antenna signals are then received and the phase of these signals is compared with the local oscillator. Assuming that the master antenna tracking is perfect, the difference in phase between the local oscillator and the slave signals then defines the orientation of the receiving antennas. The process is continued and the antenna orientation information is updated.

One problem with such a system relates to the accuracy of acquiring and locking the local oscillator to the master carrier signal. After the local oscillator is locked to the master carrier signal the multiplexing GPS receiver then acquires signals related to the slave antennas. Once all of the slave antenna information is acquired the multiplexing GPS receiver then repeats the acquisition process by once again acquiring the master carrier signal. However, during the acquisition of the slave antenna information at least two sources of error can affect the ability of the multiplexing GPS receiver aster antenna tracking.

A first error is related to the local oscillator. Assuming that the platform which the master and slave antennas are attached is static, during acquisition of the slave antenna information the local oscillator may drift resulting in a differential phase measurement error since the drift will be considered a phase shift between a given slave antenna signal and the master antenna signal.

A second error is related to the dynamic motion of the platform. Typically the platform is not static, but rather is moving in three dimensional space. If the rotational speed about an axis of the platform, for example, is large enough such that the position of the master antenna substantially changes during the cycle of multiplexing through the master and slave antenna signals, the change in position of the master antenna during this acquisition cycle will result in a substantial differential phase measurement error. This dynamic error is directly dependent on the changing orientation of the platform.

OBJECT OF THIS INVENTION

It is an object of this invention to improve the accuracy of a multiplexing global positioning system receiver by providing a scheme by which the interpolated master antenna tracking error is subtracted from the slave antenna phase measurements resulting in a differential phase measurement scheme which is insensitive to the master antenna tracking loop errors.

SUMMARY OF THE INVENTION

The foregoing and other problems are overcome and the object of the invention is realized by a method in accordance with embodiments of this invention. In accordance with one embodiment of the invention a method is provided to calculate final differential phase measurements associated with a multiplexing GPS receiver wherein master antenna tracking errors are subtracted from initial phase measurements.

BRIEF DESCRIPTION OF THE DRAWINGS

The above set forth and other features of the invention are made more apparent in the ensuing Detailed Description of the Invention when read in conjunction with the attached Drawing, wherein.

DETAILED DESCRIPTION OF THE INVENTION

Figure 1:
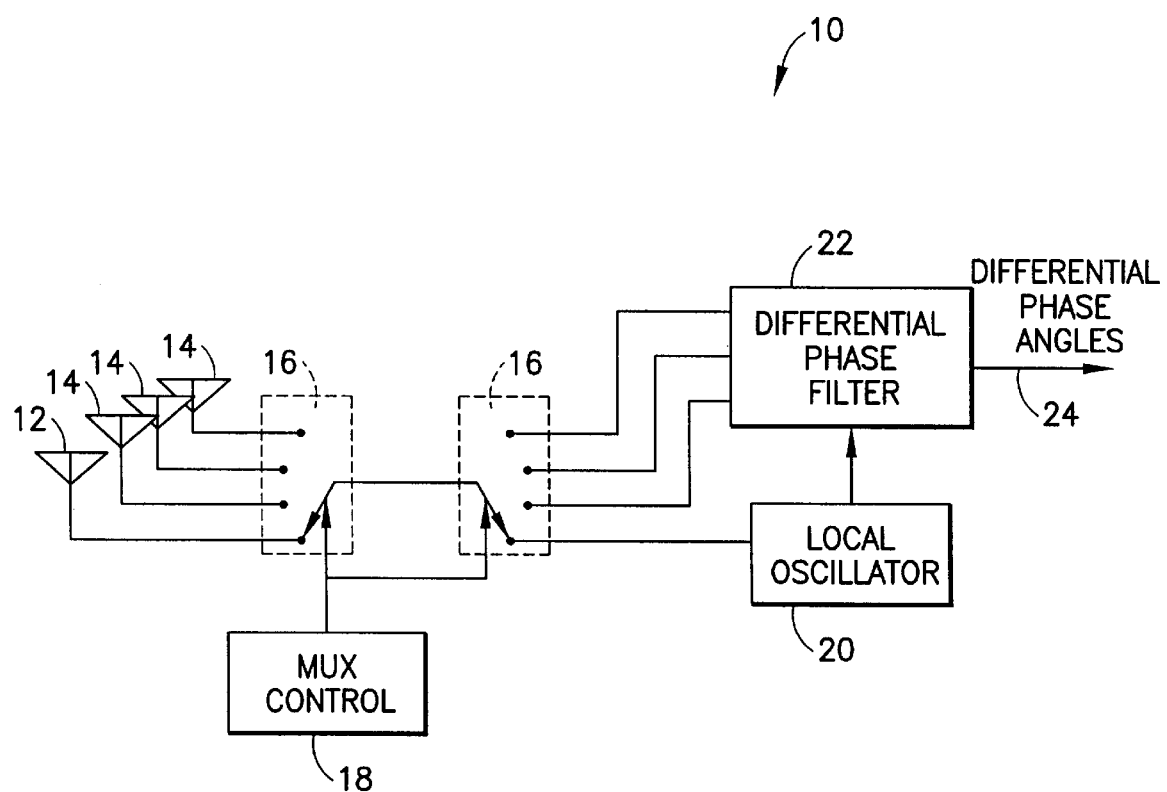
FIG. 1 is a block diagram of a multiplexing GPS receiver in the prior art.

Referring to the accompanying drawing, FIG. 1 depicts the general components of a multiplexing GPS receiver 10 known in the prior art. More specifically, a multiplexing GPS receiver 10 comprises at least two GPS antennas, a master antenna 12 and at least one slave antenna 14, a multiplexing system 16 and a corresponding controller 18, a numerically controlled local oscillator 20, and a differential phase measurement device 22. Typically, the master antenna 12 and the slave antennas 14 are arranged at known distances with respect to each other on a platform such as a ship, aircraft, or spacecraft, each antenna receiving the same GPS signal.

Generally, in operation, the multiplexing controller 18 commands the multiplexing system 16 to pass the GPS signal received by the master antenna 12 to the local oscillator 20. The local oscillator 20, typically utilizing a feedback loop (not shown), locks onto the frequency carrier and phase of the GPS signal received by the master antenna 12. The multiplexing controller 18 then commands the multiplexing system 16 to pass, one at a time, each GPS signal received by each slave antenna 14 to the differential phase measurement device 22. The differential phase measurement device 22 compares the phase relationship of the GPS signal received by each slave antenna 14 with the local oscillator signal and provides as an output a differential phase angle 24. The differential phase angles 24 can then be used to determine the orientation of the platform on which the slave antennas 14 and master antenna 12 are arranged. However, during the acquisition of the GPS signals associated with the slave antennas 14, errors may be introduced into the GPS receiving system.

In accordance with one embodiment of the invention, a reduction in GPS receiving system errors can be achieved by subtracting the master antenna tracking error from the slave antenna phase measurements. Thus, for a given GPS receiver multiplexing cycle K the corrected differential phase measurement for a slave antenna n at update K is defined as:

$$\Delta\theta_{n\_K} = \theta_{n\_K} - [(\Phi_{K+1} - \Phi_k)] \quad (1)$$

Where:

$\theta_{n_K}$ is the phase measurement for slave antenna n at update K;

$\Phi_K$ is the master antenna tracking loop error at update K;

$\Phi_{K+1}$ is the master antenna tracking loop error at update K +1; and $\beta_n$ is an interpolation coefficient by which the master antenna tracking loop errors are weighted in order to minimize slave antenna n differential phase measurement errors.

Figure 2:
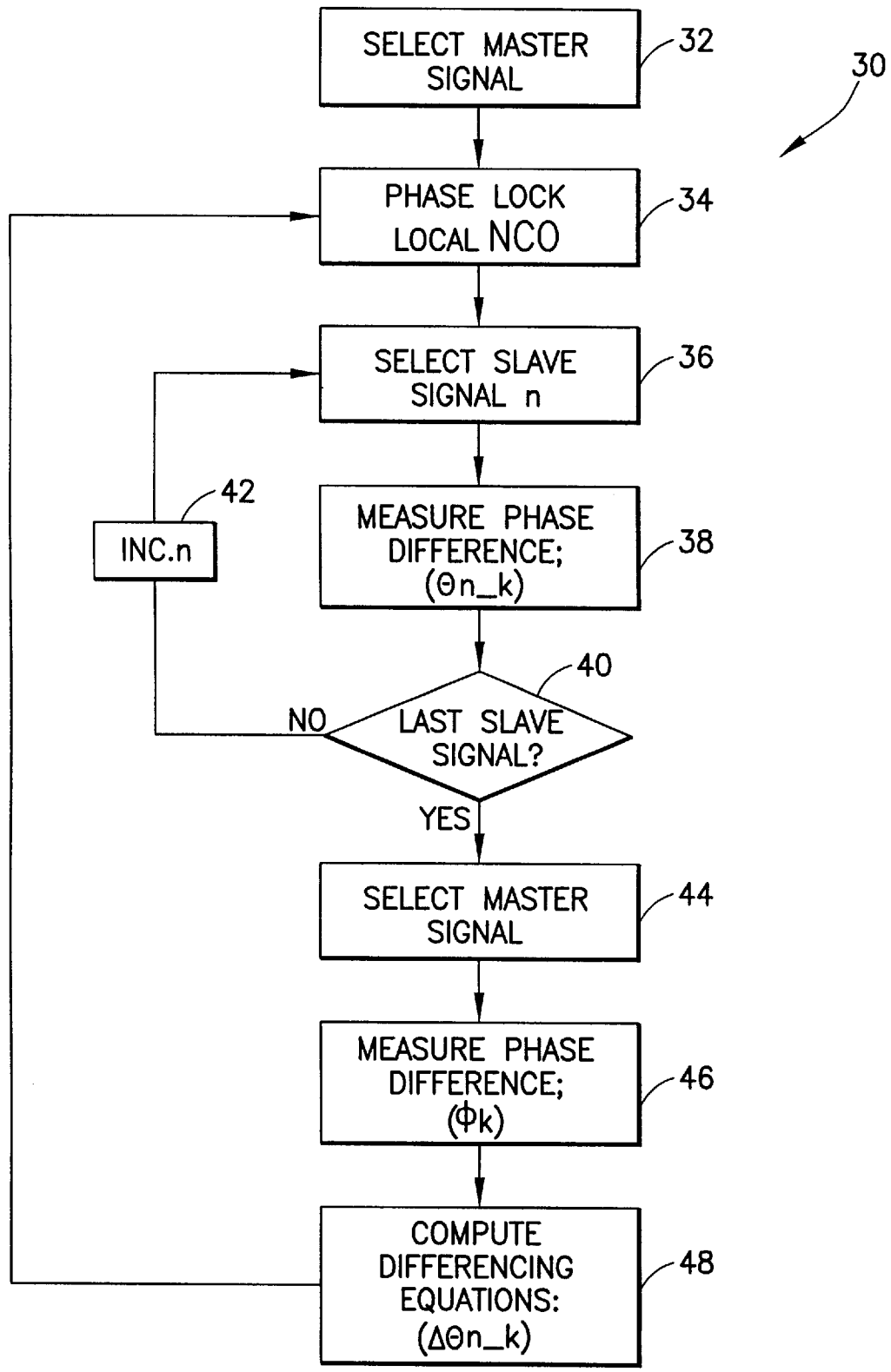
FIG. 2 is a flowchart depicting the process of eliminating the master antenna tracking error according to an embodiment of the present invention.

Referring also to FIG. 2, a method is shown in accordance with one embodiment of the invention. The corresponding multiplexing GPS receiver related to FIG. 2 comprises a number of antennas (n) whose orientation on a given platform is known. FIG. 2 depicts a method 30 comprising an initial step 32 of selecting a first antenna signal, deemed the reference or master signal. As described above, the master antenna 12 signal is used to phase lock a local numerically controlled oscillator 20 as shown in a step 34. A second antenna signal, typically deemed a slave signal, is then selected in a step 36. Next, the phase difference between the oscillator 20 and the slave antenna 14 signal is measured in a step 38 ($\theta_{n\_K}$). In a step 40 it is determined whether all slave antenna signal phase measurements have been acquired. If not, the next slave antenna is selected by instructing the multiplexing system 16 to select another slave antenna 14 signal depicted by a step 42 and the step 36, and then measuring its associated phase difference relative to the local oscillator 20 (step 38). The steps 40, 42, 36, and 38 are repeated until all phase measurements associated with each slave antenna 14 signal has been acquired. Once all slave antenna signal phase measurements are complete the multiplexing GPS receiving system 10 once again selects the master antenna 12 signal in a step 44 and measures the phase difference between the local oscillator 20 and the master antenna signal in a step 46 ($\Phi_K$). $\Phi_K$ thus represents the change in phase between the master antenna signal at the start of cycle K and at the end of cycle K. During a step 48 the differencing equation, shown above, is computed for each slave antenna 14.

The step 48 of method 30 further comprises the calculation of interpolation coefficients associated with each slave antenna 14 ($\beta_n$) signal and the determination of the next-state master antenna tracking loop error ($\Phi_{K+1}$). The purpose of the interpolation coefficients $\beta_n$ is to account for master antenna tracking errors related to the drift of the tracking loop, which can be caused by a drift in frequency of the local oscillator 20 and the inability of the tracking loop to follow a high rate of change of the master antenna position. These coefficients $\beta_n$ define the extent of which the master antenna tracking loop errors are weighted in order to minimize each of the slave antenna 14 differential phase measurements ($\Delta\theta_{nK}$). The coefficients $\beta_n$ can be calculated in one of several different ways. For example, experimental phase data can be collected and the polynomial coefficients can then be computed which minimize the standard deviation errors between the polynomial and the collected data. Also, an adaptive approach can be taken where the coefficients $\beta_n$ are modified dynamically. Using an adaptive approach, information about the dynamics of the platform, which the master antenna 12 and slave antennas 14 are attached, can be incorporated in a coefficient computation routine. Last, the coefficients $\beta_n$ can be selected to form a simple linear interpolation between the two master antenna phase lock loop tracking errors discussed above.

The determination of the next-state master antenna tracking error ($\Phi_{K+1}$) can be done in either a predictive sense or a post-processing sense. The next-state master antenna tracking error ($\Phi_{K+1}$) can be predicted by extrapolating the master antenna tracking errors ($\Phi_K$) from at least two past states allowing the calculation of the corrected differential phase measurement of a slave antenna 14, given by equation (1) above, using the next-state estimate of the master antenna tracking error in the slave antenna differencing equation. Additionally, the next-state master antenna tracking error ($\Phi_{K+1}$) can also be measured, thus the calculation of the corrected differential phase measurement of a slave antenna 14 for a multiplexing cycle K occurs after the measurement of the master antenna tracking error for a multiplexing cycle K+1. This post-processing approach is advantageous where the delay introduced in the slave antenna differencing equations due to the subsequent calculation of $\Phi_{K+1}$ is insignificant as compared with the dynamic motion of the platform on which the master and slave antennas are attached. For example, if the signals from a master antenna and three slave antennas are switched every 3 milliseconds, the total cycle time for switching through all four antennas is 12 milliseconds. Given this, a platform spinning at 0.5 degrees/second will have rotated 0.006 degrees in 12 milliseconds. The error associate with the 0.006 degrees of rotation is much smaller than the noise level of a typical multiplexing GPS receiver.

With the weighted determination of the current and next-state master tracking error, differential phase measurements associated with the slave antennas 14 of the multiplexing GPS receiver can be corrected resulting in differential phase measurements which are more accurate.

While the invention has been particularly shown and described with respect to preferred embodiments thereof, it will be understood by those skilled in the art that changes in form and details may be made therein without departing from the scope and spirit of the invention.

What is claimed is:

1. A method for reducing master antenna tracking errors in a multiplexing global positioning receiver system, comprising the steps of:

acquiring an initial phase measurement related to a slave antenna during a time period;

determining master antenna tracking errors during said time period; and calculating a final differential phase measurement related to said slave antenna during said time period by subtracting said master antenna tracking errors from said initial phase measurement.

2. The method of claim 1 wherein the step of determining master antenna tracking errors during said time period further comprises the step of determining next-state master antenna tracking errors, wherein said master antenna tracking errors during said time period are a function of said master tracking errors of said time period and said next-state master antenna tracking errors.

3. The method of claim 2 wherein the step of determining master antenna tracking errors during said time period further comprises the step of calculating an interpolation coefficient wherein the affect of said master antenna tracking errors on calculating said final differential phase measurement can be controlled.

4. A method for reducing master antenna tracking errors in a multiplexing global positioning receiver system, comprising the steps of:

acquiring an initial phase measurement related to a slave antenna during a time period;

determining master antenna tracking errors during said time period; and calculating a final differential phase measurement related to said slave antenna during said time period by subtracting said master antenna tracking errors from said initial phase measurement, wherein the step of determining master antenna tracking errors during said time period further comprises the step of determining next-state master antenna tracking errors, wherein said master antenna tracking errors during said time period are a function of said master tracking errors of said time period and said next-state master antenna tracking errors and calculating an interpolation coefficient wherein the affect of said master antenna tracking errors on calculating said final differential phase measurement can be controlled and wherein the step of calculating the master antenna tracking error further comprises the step of calculating:

$$\Phi_k = [\Phi_k + \beta(\Phi_{k+1} - \Phi_k)]$$

Where:

$\Phi_k$ is the master antenna tracking loop error during said time period;

$(\Phi_{k+1}$ is said next-state master antenna tracking loop error; and $\beta$ is said interpolation coefficient for said slave antenna by which the master antenna tracking loop errors are weighted in order to minimize each of the slave antenna differential phase measurement errors.

5. The method of claim 3 wherein the step of determining next-state master antenna tracking errors further comprises the step of predicting said next-state master antenna tracking errors by extrapolating master antenna tracking errors from past states.

6. The method of claim 3 wherein the step of determining next-state master antenna tracking errors further comprises the step of measuring the master antenna tracking errors at said next-state wherein said final differential phase measurement of said slave antenna for said time period is calculated during said next-state.

7. A method for reducing the master antenna tracking error in a multiplexing global positioning system receiver, comprising the steps of:

providing a multiplexing global positioning system receiver, said receiver time multiplexing at least a first and a second GPS signal corresponding to at least a first and a second GPS antenna;

phase locking a numerically controlled local oscillator to said first GPS antenna signal during a first time period;

measuring a phase difference between another of said GPS antenna signals and said numerically controlled local oscillator, wherein said phase difference defines an initial differential phase measurement;

measuring the phase difference between said first GPS antenna signal and said numerically controlled local oscillator, wherein said measurement defines a tracking loop error of said first GPS antenna signal; and calculating a final differential phase measurement of said second GPS antenna signal by subtracting said tracking loop error from said initial differential phase measurement.

8. A method for reducing the master antenna tracking error in a multiplexing global positioning system receiver, comprising the steps of:

phase locking a numerically controlled local oscillator to a first GPS antenna signal during a first time period;

measuring a phase difference between a second GPS antenna signal and said numerically controlled local oscillator during a second time period which follows said first time period;

defining a master antenna tracking loop error by measuring a phase difference between said first GPS antenna signal and said numerically controlled local oscillator during a third time period which follows said second time period; and calculating a differential phase measurement for said second GPS antenna signal by subtracting said master antenna tracking loop error from said phase difference measurement during said second time period.

* * * * *